Figures 1, 2, 3:
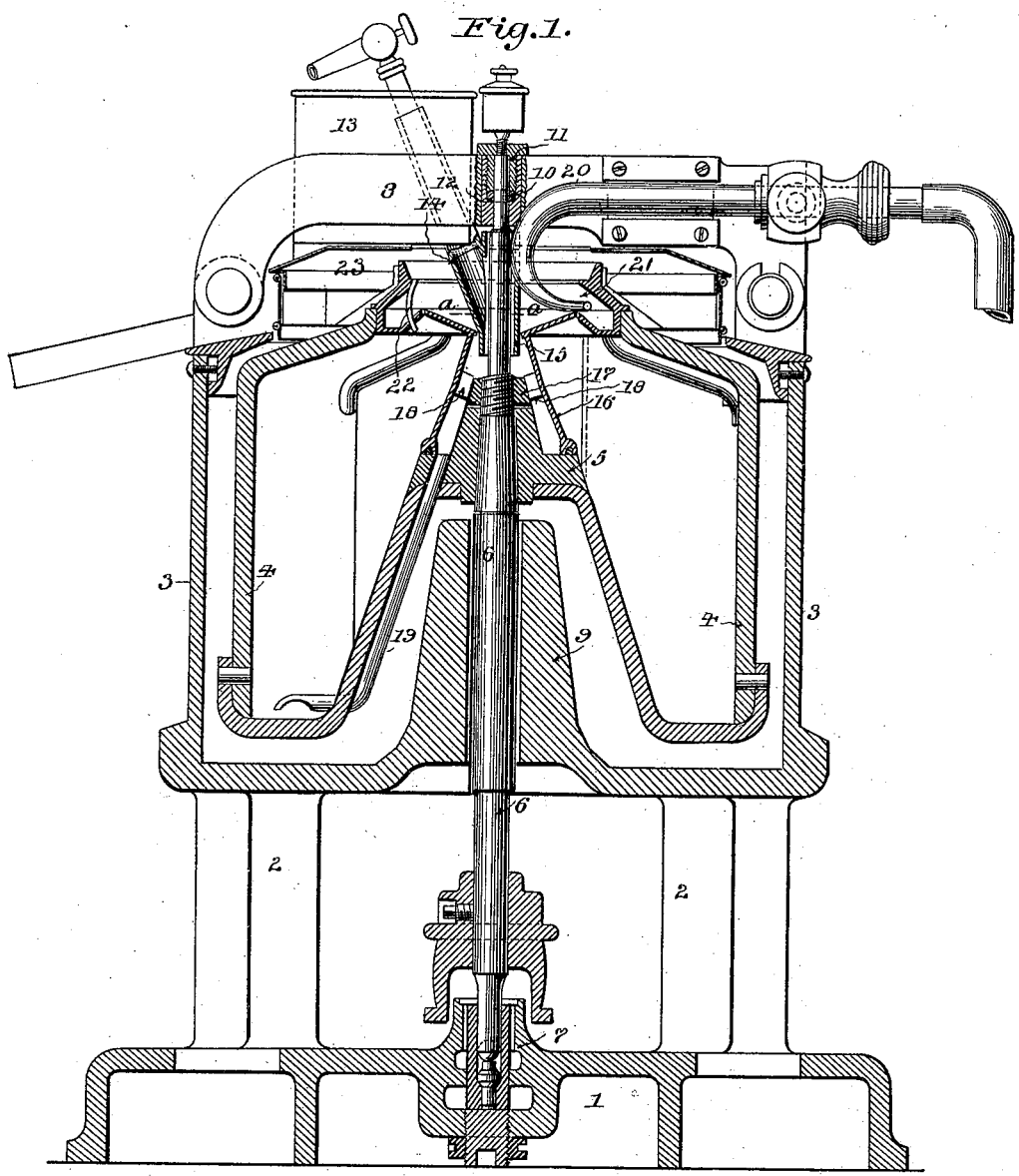

No. 621,706. Patented Mar. 21, 1899.
A. H. REID.
CENTRIFUGAL CREAM SEPARATOR.
(Application filed July 7, 1898.)
(No Model.)

On line a-a

WITNESSES:
Arthur Ashley
J. H. Elmore

INVENTOR
A. H. Reid
BY
Phil. T. Dodge
ATTORNEY.

THE NORRIS PETERS CO., PHOTO-LITHO., WASHINGTON, D. C.

UNITED STATES PATENT OFFICE.

ALBAN H. REID, OF PHILADELPHIA, PENNSYLVANIA.

CENTRIFUGAL CREAM-SEPARATOR.

SPECIFICATION forming part of Letters Patent No. 621,706, dated March 21, 1899.

Application filed July 7, 1898. Serial No. 685,363. (No model.)

*To all whom it may concern:*

Be it known that I, ALBAN H. REID, of Philadelphia, county of Philadelphia, and State of Pennsylvania, have invented a new and useful Improvement in Centrifugal Separators, of which the following is a specification.

This invention relates to centrifugal separators comprising a rotary separating-bowl in which the whole milk is placed and the bowl subjected to a rapid rotary motion to separate the milk into its constituent elements, blue milk and cream.

The invention consists of a bearing of improved form and construction for the rotary bowl, of an improved manner of feeding the whole milk to the bowl, and of certain other details and features of construction hereinafter described and claimed.

In the accompanying drawings, Figure 1 is a vertical central sectional elevation of my improved separator. Fig. 2 is a horizontal section on the line *a a* of Fig. 1.

Referring to the drawings, 1 represents a base-frame, giving support by standards 2 to a cylindrical casing 3, within which revolves a separating-bowl 4, in which whole milk to be separated is introduced. The bowl has its bottom inclined upward at the center in the form of a cone, on the upper end of which is firmly secured in the interior of the bowl a collar 5, fixed to a vertical driving-shaft 6, sustained at its lower end in a bearing 7 on the base-plate and at its upper end in a bearing in an arm 8, extending diametrically across the upper end of the cylindrical casing and sustained thereby. From this description it will be seen that the vertical driving-shaft carrying the bowl is supported in bearings located, respectively, above and below the same, by reason of which arrangement the shaft where it revolves in its bearings may be of small size, owing to the absence of undue strain thereon. This is of advantage in that the lubricating of the bearings is easily effected and require but little oil and attention. In the use of bearings, however, of this nature there is a liability of the shaft in the upper bearing breaking on account of the great speed at which the bowl is driven, and to prevent the bowl from falling and being destroyed in the event of the breakage of the shaft I provide a guard for the same in the form of a housing 9, extending from the bottom of the casing around the shaft and upward into the conical bottom of the bowl. The opening in the housing through which the shaft extends is appreciably larger than the shaft, so as not to contact therewith under normal conditions, but only in the event of the upper end of the shaft giving way. In such an event the housing, in connection with the lower bearing, will afford an effective support to maintain the bowl in a vertical position, so that the motion of the bowl could be stopped for repairs before any further injury thereto. It will be observed that the housing 9 is of considerable thickness and bears such a relation to the bowl and shaft that it is well adapted to hold the shaft upright against its natural tendency to fall in the event of the upper bearing breaking away. In such an event this housing becomes, in effect, a bearing for the shaft. In practice it has been found that when the shaft is thus sustained in bearings above and below the bowl there is a rapid vibratory or trembling of the shaft in the upper bearing, and to avoid this I propose to insert in the bearing a collar 10, formed of wood or equivalent material, with the grain extending transversely of the shaft and around the same. The collar is conveniently applied by forming the upper portion of the bearing in the form of a removable sleeve 11, screwed into the lower portion and confining the wooden collar between the lower end of the sleeve and an annular shoulder 12 on the lower portion of the bearing. By reason of the material of which this collar is formed it can be tightened around the shaft to a degree sufficient to prevent the vibratory motion of the latter, but not to interfere with its free rotation. This may be effected by screwing the movable sleeve 11 downward against the upper edge of the collar, which will result in tightening it around the shaft.

The whole milk is fed to the bowl from a reservoir 13, sustained at the top of the cylindrical casing, and from the reservoir it flows through an inclined pipe 14, communicating through the side of a sleeve 15, connected thereto and surrounding the shaft. The lower end of the sleeve extends into the upper end of a hollow feeding-cone 16, having its lower end resting on the collar 5 and sustained firmly in position by a nut 17, screwed on the upper end of the shaft and connected to the cone by arms 18. It is seen from this construction that the milk is fed from the reservoir through the side of the sleeve to the side of and around the driving-shaft, whence it passes downward through the feeding-cone and into the bottom of the bowl through the downwardly-extending pipes 19.

The blue milk finds its exit through the pipe 20, having its end extended in a skim-milk chamber 21 at the top of the bowl, and the cream passes upward through pipes 22 at the top of the bowl and over its upper edge, whence it flows into a cream-pan 23, sustained by the casing.

Having thus described my invention, what I claim is—

1. In a centrifugal separator the combination with a rotary bowl, of a continous vertical driving and sustaining shaft connected thereto, bearings for the shaft situated respectively above and below the bowl only, and a fixed guard loosely surrounding the shaft below the bowl and normally free of the same and adapted to prevent the fall of the bowl in the event of the breakage of the shaft.

2. In a centrifugal separator the combination with a rotary bowl formed with an upwardly-extending bottom, of a vertical shaft connected to the bowl, bearings for the shaft situated respectively above and below the bowl, and a housing loosely surrounding the shaft normally free of the same and extending upward into the bottom of the bowl and adapted to form a bearing for the shaft and prevent the fall of the same in the event of the upper bearing giving way.

3. In a centrifugal separator the combination with a vertical shaft mounted at its upper end in a bearing, of a rotary bowl fixed to the shaft below the bearing and provided with a feeding-cone, a relatively-fixed sleeve surrounding the shaft below the bearing and extending into the feeding-cone, and a supply-pipe communicating through the side of the sleeve.

In testimony whereof I hereunto set my hand, this 28th day of June, 1898, in the presence of two attesting witnesses.

ALBAN H. REID.

Witnesses:
EDW. H. JACOB,
WM. E. ANDERSEN.